Nov. 29, 1960     J. R. DILLEY ET AL     2,962,230
PROCESS AND APPARATUS FOR REMOVING RAT EXCRETA PELLETS
AND OTHER FOREIGN MATERIALS FROM WHOLE CORN KERNELS
Filed Jan. 6, 1959     3 Sheets-Sheet 1
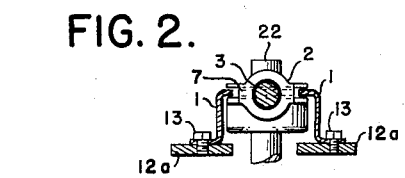
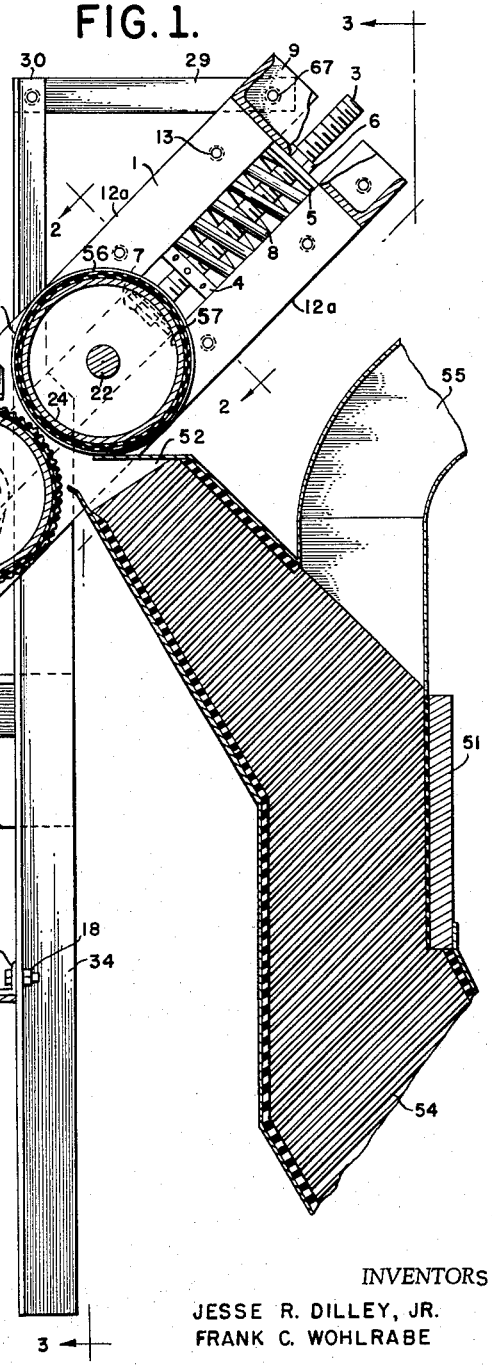
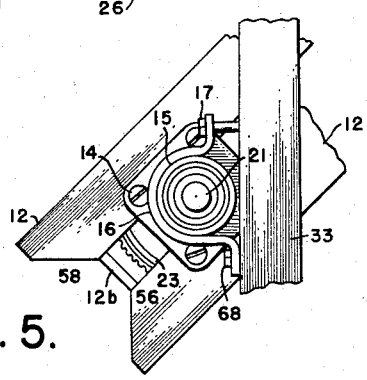
INVENTORS
JESSE R. DILLEY, JR.
FRANK C. WOHLRABE
BY *[signature]*, ATTORNEY Nov. 29, 1960   J. R. DILLEY ET AL   2,962,230
PROCESS AND APPARATUS FOR REMOVING RAT EXCRETA PELLETS
AND OTHER FOREIGN MATERIALS FROM WHOLE CORN KERNELS
Filed Jan. 6, 1959   3 Sheets-Sheet 2

INVENTORS
JESSE R. DILLEY
FRANK C. WOHLRABE
BY
ATTORNEYS

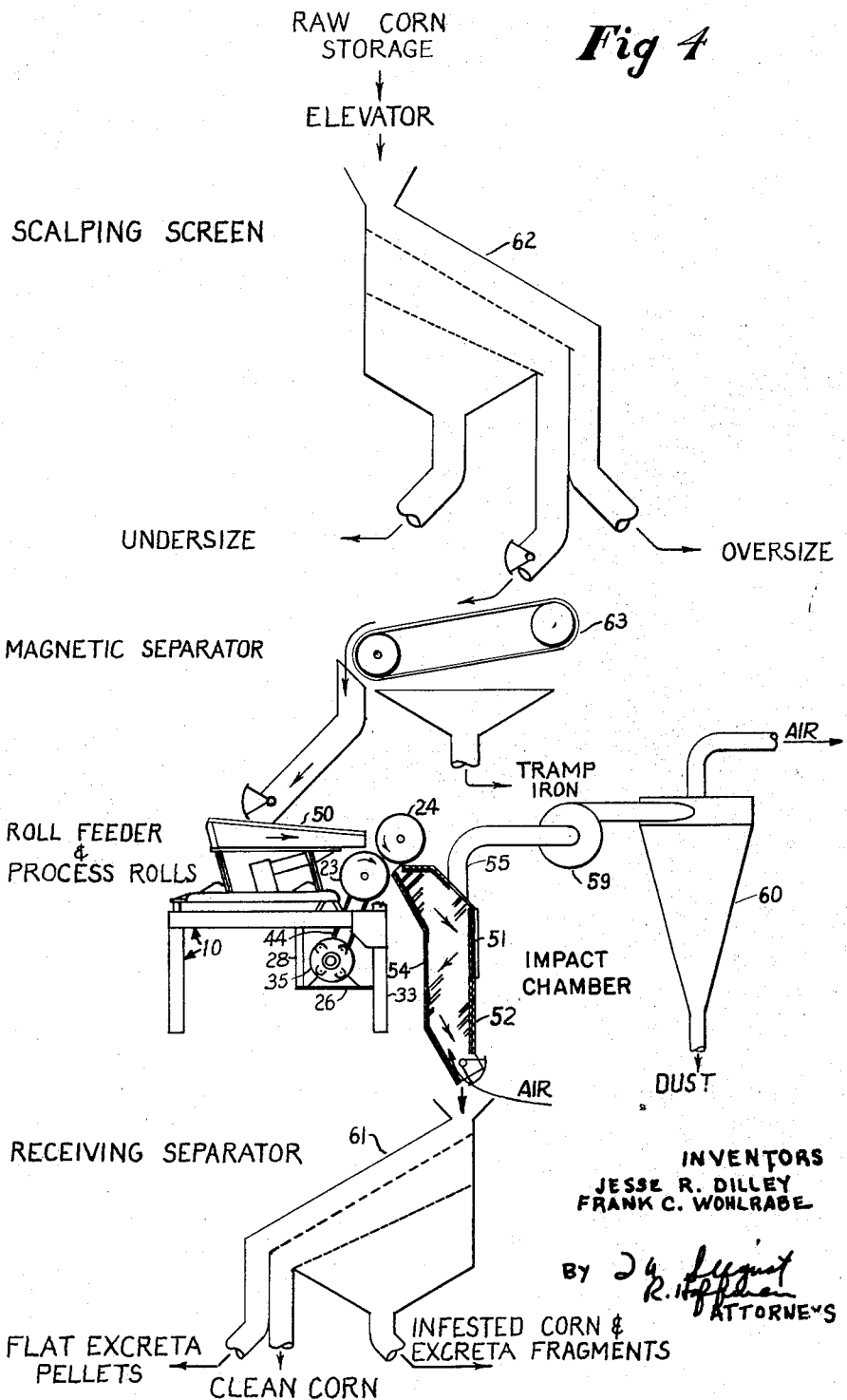

2,962,230
Patented Nov. 29, 1960

2,962,230

PROCESS AND APPARATUS FOR REMOVING RAT EXCRETA PELLETS AND OTHER FOREIGN MATERIALS FROM WHOLE CORN KERNELS

Jesse R. Dilley and Frank C. Wohlrabe, Peoria, Ill., assignors to the United States of America as represented by the Secretary of Agriculture Filed Jan. 6, 1959, Ser. No. 785,297

9 Claims. (Cl. 241—9)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to machinery used in the corn milling industries for cleaning shelled corn. In particular, it is related to machinery that requires no pretreatment of the corn other than scalping (removal) of large particles, so that it can be used in any corn cleaning system utilizing size, shape, and specific gravity separation, and by its use improve the effectiveness of the system for removing contamination consisting of rodent excreta pellets and insect damaged kernels.

One object of this invention is to augment conventional cleaning means such as size, shape, and specific gravity separators, by acting upon the rat excreta pellets of the same size, shape, and specific gravity as shelled corn, thus altering their physical properties so as to permit their separation from the whole corn kernels, without injuring the corn kernels. Another object of the invention is to permit the changing of the physical characteristics of rat excreta pellets so that they can be separated from whole corn kernels without the necessity of adjusting the moisture content of the corn out of the normal range in which the corn is received and processed. Still another object of the invention is to break up insect infested kernels so that they may be removed by subsequent size, shape, and specific gravity separators.

Further objects include the provision of equipment for improving the cleanliness of corn products which will separate rat excreta pellets and insect-infested kernels from good whole corn kernels, which can be installed in small mills as well as in large mills at reasonable cost, and which can be operated and maintained by unskilled mill personnel.

The methods used at present for cleaning corn and effecting a partial removal of rodent excreta pellets employ machines that accomplish separation by differences in size, shape, specific gravity, and dielectric strength. A multiplicity of combinations of machines utilizing these principles of separtion is usually employed. Screening is practiced almost universally in the prior art for removing oversized and undersized particles from whole corn kernels, usually in conjunction with aspiration to remove dust, chaff, pieces of corncob, and other light particles. Scouring, a mild form of attrition, is frequently employed in the prior art to loosen adhering foreign material from the whole corn kernels. Depending upon the sizes and kinds of screens used in the screening process, practically all of the mouse excreta pellets, and from one-half to three-fourth of the rat excreta pellets are removed by conventional cleaning processes employing screening, scouring, and aspiration.

According to another method of procedure in the prior art, corn from the "milling separator" is processed in a flotation washer, which removes stones, dust, and materials of a lower density, but this process has the disadvantage that the corn must then be dewatered in centrifuges or screens. About 75 percent or more of the rat excreta pellets remaining after passage through the "milling separator" are skimmed from the surface of the flotation washer.

Another method for further purifying the corn from the screening and aspiration processes that is practiced in the prior art is to pass the screened and aspirated mixture through a specific gravity separator operated with air. About 75 percent or more of the remaining pellets are separated from the whole corn kernels by this method.

According to another method of procedure in the prior art, the mixture from the screening and aspiration operations is passed through precision size separators of various types. About 75 percent or more of the pellets remaining after screening and aspiration are removed.

According to another method of procedure in the prior art, materials of lower or higher density than whole corn kernels, and those materials having different aerodynamic properties by virtue of shape, are separated by a combination of air flotation and gravity flow applied to a vibrating conveyor deck. About 75 percent or more of the rat excreta pellets remaining after screening and aspiration are removed by this method, some in the light fraction, others in the heavy fraction, along with the stones present in the feed.

Another method for obtaining nearly complete removal of rat excreta pellets from corn that is practiced in the prior art consists in passing the impure corn from the screening processes through a series of electrostatic separators. A reject fraction containing rat excreta pellets, broken and infested kernels, insects, worms, foreign seeds, and other materials having similar dielectric strengths, is separated from the bulk of the kernels under the forces of an electrostatic field. This procedure has the disadvantage of erratic operation with feed of non-uniform moisture content, a requirement for high voltages (20,000 to 40,000 volts), and in requiring numerous recyclings to hold the reject fraction to an economically feasible level.

Despite the use of elaborate cleaning procedures, rat excreta pellets are often present in cleaned corn kernels to the extent of one to four pellets per bushel of corn kernels. These pellets are of the same size and specific gravity range as corn kernels.

We have discovered another property of rat excreta pellets that may be employed as the basis of a simple separation method for reducing the contamination from this source by 90 percent or more. We have discovered that most rat excreta pellets in the usual range of moisture conditions undergo deformation and/or fracture at a lower intensity of combined compression, impact and shear stresses than do corn kernels. We have also discovered that some rat excreta pellets will shatter more readily than corn kernels when the contaminated corn is sequentially subjected one or more times to stresses comprising a non-crushing pressure (total inter-roller pressure of 350–450 pounds distributed along the 12 inches long deformable interface) and critical impingement impact and shearing stresses produced by ejection from the rollers at linear speeds of 20–100 feet per second onto another deformable, ribbed surface.

Although we have found that a variety of methods and apparatus may be employed to effectively accomplish the selective deformation and fragmentation of rat excreta pellets, we prefer to use one or more pairs of crushing rolls about 6 inches in diameter with ribbed rubber covering, about eight ribs per inch and one-sixteenth of an inch deep, with one roll of the pair having ribs at right angles to the axis of rotation, and the other roll of the pair having ribs running parallel to the axis of rotation, with the rolls rotating at high speeds, 1000 to 4000 r.p.m., and with no gap between the rolls. The mixture of corn kernels and pellets is fed to the rolls at an even rate so that a line of single kernels is present at the point of contact between the rolls. The discharge from the rolls is ejected at velocities in the range of 20 to 100 feet per second and permitted to impinge upon a ribbed rubber impact plate to complete the disintegration and shape alteration of cracked pellets and other impurities.

The moisture content of the corn and rat excreta pellet mixture is not a critical factor. The selective disintegration process operates successfully on corn having a moisture content in the range of 10 to 16 percent.

According to our process, corrugated rolls with corrugations on one of the rolls at right angles to the corrugations on the other roll may be used to modify those rat excreta pellets that cannot be removed by conventional means, along with insect infested corn, so that these impurities may be separated from good corn kernels which remain unaffected during the processing by size, shape, and specific gravity separation methods. The various modifications of the process will be more fully understood after a consideration of our specific disclosures of preferred embodiments of the invention. The apparatus employed is composed in general of a feeding device, one or more pairs of crushing rolls, one or more impact surfaces, and one or more screens and air separation devices.

Other features and advantages of the invention will appear from the following descriptions taken in connection with the drawings.

In said drawings:

Fig. 1 is a side elevation sectional view of the feeder, rolls, and impact chamber, taken on line 1—1 of Figure 3;

Figure 2 is a section, taken on line 2—2 of Figure 1, through the bearing support of the yieldingly mounted roll;

Figure 4 is a flow sheet showing one method for cleaning corn which includes the process according to our invention.

Figure 5 is a partial side view showing one trunnion bearing detail.

Figure 3:
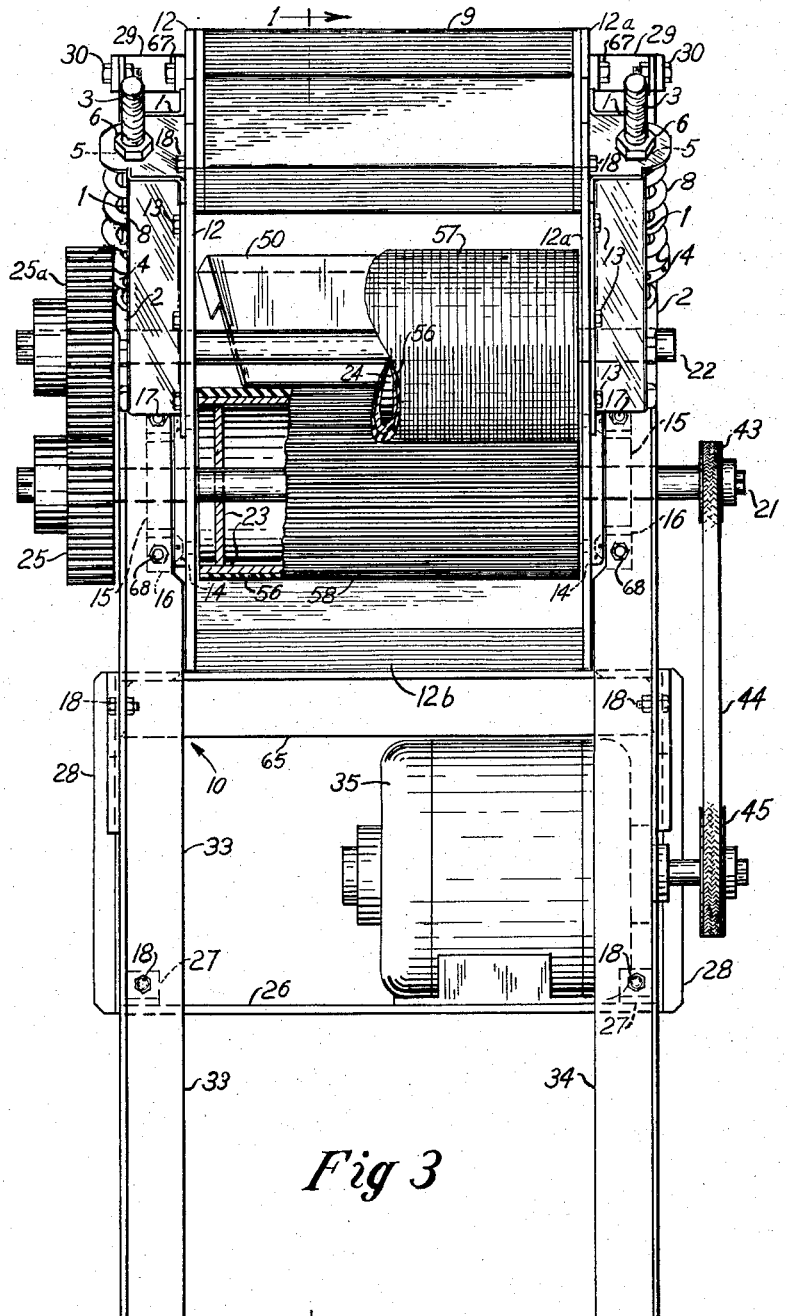
Figure 3 is a front elevation along line 3—3 of Figure 1, of the rolls and cooperating members.

While one embodiment of the invention is illustrated in the above referred to drawings, it is to be understood that it is merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claims. While there is stated the primary field of utility of the invention, it remains obvious that it may be employed in any other capacity wherein it may be found applicable.

Referring to the drawings for a more particular description, like numerals of reference designate like or corresponding parts throughout the several views. The machinery support frame, parts of which are shown in Figures 1 and 3, is indicated by the number 10. The principal parts of the rat excreta pellet crushing and removing system according to this embodiment of the invention are a scalping screen 62, magnetic separator 63, (optional, for removing freight-car acquired nuts, bolts, etc.) a conventional vibratory feeder 50, corrugated rubber covered crushing rolls 23 and 24, an impact plate 51, an impact chamber 52 partially lined with impressionable material at the rebound zone 54, an air exhaust fan 59, a cyclone separator 60, and conventional grain screening machinery 61.

The machinery support frame, indicated generally as 10, consists of two side beams 64 and two transverse beams 65, one transverse beam being fastened across the ends of the side beams, and the other transverse beam being fastened at an intermediate position on the length of the side beams so as to enclose a rectangle, but with the side beam ends projecting beyond the rectangle at the end the roll assembly is located, with short legs 66 attached to each corner at the rear of the vibratory feeder 50, and two columns 33 and 34 attached to the front corners of the support frame 10, with the lower portion of columns 33 and 34 functioning as front legs for support 10 and the upper portion of columns 33 and 34 functioning as stanchions which provide support for the roll assembly.

Vibratory feeder 50 is mounted over the rectangular frame of support 10 and is attached to both transverse beams. Beneath the rectangular frame of support 10 is located the prime mover 35, shown in Figures 1 and 3 as an electric motor, mounted on base plate 26 which in turn is attached to the side beams of support 10 by means of hangers 28 and bolts 18, and to columns 33 and 34 by means of clip angles 27 and bolts 18. The rat excreta pellet roll crusher assembly is mounted on the stanchions 33 and 34 and discharges to impact chamber 52. Elements of the roll crusher are driven by a belt 44 which is trained over pulleys 43 and 45, the pulley 45 being positioned on prime mover 35, and pulley 43 on one end portion of shaft 21, whereby the crushing rolls 23 and 24 are rotatably connected to prime mover 35. Crushing rolls 23 and 24 are positioned in a rectangular frame having two identical pairs of side bars 12 and 12a attached to end structure 12b, with end structure 9 secured with bolts 67 between the opposite free ends of the two pairs of side bars 12 and 12a. The structure hereinafter referred to as the roll frame assembly is made up of side bars 12 and 12a, integral end structure 12b, and removable end structure 9. The rolls are driven by a gear train consisting of a pair of identical coarse-toothed spur gears 25 and 25a with pitch diameters slightly less than the roll diameter. Said gear 25 is positioned outside of the roll frame assembly on shaft 21, and said spur gear 25a is positioned outside of the frame on shaft 22, means by which shaft 22 with roll 24 is contrarotatably connected to rotatable shaft 21 and roll 23. Shaft 21 of the bottom crushing roll 23, having opposite end portions, is journaled in flange bearings 15 attached to side bars 12 and 12a by means of flat head screws 14, the cylindrical periphery of said flange bearings 15 constituting trunnion journals so that the roll frame assembly is pivotably mounted on stanchions 33 and 34 by means of trunnion supports 16 attached by means of holding bolts 68 and clamping bolts 17 to said stanchions. The pivotably mounted roll frame assembly is restrained by tie bars 29 spanning the distance between and connecting stanchions 33 and 34 and the upper most corners on each side of the roll frame assembly by means of bolts 30 and 67 respectively.

The top crusher roll 24 with transverse support shaft 22, whose opposite end portions are journaled in self-aligning spherical bearing block 2, same having grooved guideways at their sides, is slideably mounted between opposite pairs of slide rails o fthe bearing frames 1, with slide rail flanges attached longitudinally and parallel to each side of frame bars 12 and 12a by capscrews 13, thereby allowing movement of either or both ends of shaft 22 away from shaft 21. An adjusting screw 3, the unthreaded end of which is secured in a socket of bearing block 2 by pin 7, and the threaded end of which passes freely through and extends beyond the hole in spring bushing 5 in the end plate of slide rails of bearing frames 1, and having a spring compression adjusting nut 4 bearing upon spring 8, is the means by which the roll 24 is urged toward roll 23 but restrained by means of gap adjusting nut 6. Top crushing roll 24 comprises a cylindrical body of hollow construction coaxially secured on shaft 22, and has a two-layer surface of impressionable materials 56 and 57 adhered to the peripheral surface of said cylindrical body, with radial ribs 69 and grooves on and in the peripheral surface of the outer layer 57 positioned to selectively crack and deform rodent excreta pellets at the line of contact with bottom roll 23. Bottom crushing roll 23, comprising a cylindrical body of hollow construction identical in shape and size to roll 24, has a two-layer surface of impressionable materials 70 and 58 adhered to the peripheral surface of said cylindrical body, and coaxially secured to shaft 21, but differing from the top roll only in that orientation of ribs and grooving 71 in the outer layer 58 is longitudinal. Said impressionable materials 56, 57, 58, and 70 possess mechanical properties, such as density and thickness, such that the forces acting upon material passing through the nip of the rolls is greater in magnitude than the resistance of rat excreta pellets, but less in magnitude than the fracture threshold of good corn, thereby accomplishing the deformation and fragmentation of rat excreta pellets without damage to good corn.

With the parts assembled as illustrated, the rat excreta pellet crusher with its feeding device is installed in the corn cleaning system following a conventional scalping screen 62 which removes the larger pieces of debris from the corn as it comes from the elevator and a magnetic separator of known construction 63 to remove tramp iron. The corn is fed by means of feeder 50 to the crushing rolls 23 and 24 and projected into the impact chamber 52, where it impinges upon impact plate 51 thereby causing fragmentation of prestressed rat excreta pellets and insect-damaged corn. Some removal of contamination is effected by entrainment in an airstream transverse to the path of the projected and rebounding particles into aspiration hood and duct 55, while the undamaged corn falls to the hopper bottom of the impact chamber 52 and thence to conventional size shape and specific gravity separators.

From the foregoing specifications it will become apparent that the invention disclosed will adequately accomplish the functions for which it has been designed and in an economical manner, and that its simplicity, accuracy, and ease of operation are such as to provide a relatively inexpensive device, and one that will find an important place in the art to which it pertains when once placed on the market.

Changes in size, shape, arrangement of details and parts such as may come within the purview of the invention claimed may be resorted to in actual practice if desired.

The following specific examples further illustrate the invention, but are not to be considered limiting:

Example I

Fifty rat excreta pellets and 5.5 pounds of corn with slight insect damage and previously cleaned over a $^{16}\!/_{64}$-inch round hole screen were mixed together and placed in the vibratory feeder of the apparatus illustrated in Figures 1 and 3. The rat pellets were all of a size such that they were retained on a $^{16}\!/_{64}$-inch round hole screen. The apparatus of Figures 1 and 3 was equipped with a pair of 6-inch diameter rolls, each having a covering consisting of a $^{7}\!/_{32}$-inch thick medium hard rubber cushion layer and a $^{5}\!/_{32}$-inch thick ribbed mat top layer. In the bottom roll the ribbed mat outer layer had ribs and grooves $\frac{1}{8}$-inch apart and $\frac{1}{16}$-inch deep, oriented parallel to the bottom roll shaft. The top roll outer layer was the same kind of matting, but with the ribs and grooves oriented at right angles to the ribs of the bottom roll. The roll gap was adjusted to zero, and the roll pressure was adjusted to 450 pounds. The contaminated corn was given three passes through the rolls, each at a rate corresponding to about twenty bushels per hour. The rolls were adjusted to turn at 71 r.p.m. for the first pass and 280 r.p.m. for the second and third passes. At the conclusion of the third pass the corn and fragmented rat excreta pellets were screened and aspirated in an apparatus equipped with $^{16}\!/_{64}$-inch round hole screens. The cleaned corn contained three rat pellet fragments from the original 50. The total weight of broken corn and rat pellet fragments passing through the screen or removed by aspiration was 2 ounces, amounting to a 2.3 percent loss of corn.

Example II 5.5 pounds of slightly insect damaged corn, previously cleaned over a screen with $^{16}\!/_{64}$-inch round holes and aspirated, were mixed with 50 rat excreta pellets and placed in the hopper of the apparatus illustrated in Figure 4. The rat pellets were of a size such that they were retained on a $^{16}\!/_{64}$-inch round hole screen. The equipment and adjustments remained the same as in Example I. The corn was fed at the rate of 6 bushels per hour, and three passes through the rolls were made, the first at a roll speed of 71 r.p.m., and the second and third at 280 r.p.m. At the conclusion of the third pass the corn and fragmented pellets were screened and aspirated in an apparatus equipped with $^{16}\!/_{64}$-inch round hole screens. The cleaned corn contained one rat pellet fragment from the original 50. The total weight of broken corn and pellet fragments was 3.1 ounces, equivalent to a corn loss of 3.6 percent.

Example III 5.6 pounds of corn, previously cleaned over a screen with $^{16}\!/_{64}$-inch round holes and aspirated, were mixed with 50 rat excreta pellets and placed in the hopper of the apparatus illustrated in Figures 1 and 3. The rat pellets were of a size such that they were retained on a $^{16}\!/_{64}$-inch round hole screen. The rolls described in Examples 1 and 2 were used. The roll gap was adjusted to zero, and the roll pressure was adjusted to about 350 pounds. The rolls turned at 2500 r.p.m., a surface speed and exit velocity of 65.5 feet per second. The stream of discharging corn and pellets impinged on an impact surface made up of a wooden board covered with one layer of ribbed matting of the same type as that used for the external roll covering, and oriented at 45° to the path of discharge. After one pass through the rolls the corn and fragmented pellets were screened and aspirated in an apparatus equipped with $^{16}\!/_{64}$-inch round hole screens. The cleaned corn contained two rat pellet fragments of the original 50. The total weight of broken corn and rat pellet fragments passing through the screen or removed by aspiration was 2.5 ounces, equivalent to a corn loss of 2.8 percent.

We claim:

1. A continuous method of cleaning a mixture of shelled corn containing rate excreta pellets of similar size and shape and insect-damaged corn kernels which comprises subjecting a monolayer stream of contaminated corn to a pressure sufficient to prestress and deform the rat excreta pellets and infested corn but insufficient to crush good whole corn, then impelling said mixture against an impact surface at a velocity sufficient to fracture said pellets and infested corn but insufficient to damage good whole corn, and then separating the good whole corn from the particles of fractured rat excreta pellets and infested corn.

2. The process of claim 1 wherein the good whole corn is separated from the particles of fractured rat excreta pellets and infested corn by subjecting the mixture after impact to a stream of air to carry away particles of low specific gravity and then screening the remaining mixture to separate good whole corn from particles of fractured rat excreta pellets and insect-infested corn.

3. A continuous process for removing from good whole corn kernels contaminants comprising rat excreta pellets and insect-damaged corn kernels having density and size characteristics similar to that of whole corn kernels which comprises subjecting a mixture of whole corn kernels containing said contaminants to compression and cleavage forces sufficient to selectively deform and fragment the rat excreta pellets and insect-damaged corn kernels but insufficient to damage good whole corn kernels thereby to effect a reduction in size and change in shape of the rat excreta pellets and insect-damaged corn, then impelling the mixture in free flight against an impact surface at a velocity sufficient to effect a further reduction in size and change in shape of the rat excreta pellets and insect-damaged corn but insufficient to damage good whole corn kernels, and passing a stream of air countercurrent to the flight of the mixture at a velocity sufficient to entrain light fractured material but insufficient to entrain good whole corn kernels.

4. Apparatus for continuously separating rat excreta pellets and insect-damaged corn kernels from good whole corn kernels contaminated with the same which comprises a support, a pair of elongated rolls axially parallel to each other rotatably mounted on said support and adapted to impel particulate material fed between said rolls, a yieldable surface on each of said rolls, means for adjusting the gap distance and pressure between said rolls, means for simultaneously driving said rolls in a contrarotational direction, a feeder mounted on the support at one side of the rolls adapted to feed a monolayer of a mixture of good whole corn kernels contaminated with rat excreta pellets and insect-damaged corn kernels into the nip of said pair of rolls whereby pressure is applied to said mixture and said mixture is impelled beyond said rolls, an impact chamber beyond said rolls having an impact plate and a lining of ribbed yieldable material adapted to receive said impelled mixture, means for passing a current of air through said impact chamber countercurrent to said impelled mixture, and means for separately collecting good whole corn kernels and contaminants.

5. The apparatus of claim 4 wherein the yieldable surface of the rolls is provided with a plurality of corrugations.

6. The apparatus of claim 5 wherein the corrugations on the yieldable surface of one of the pair of rolls are disposed at right angles to the corrugations on the yieldable surface of the other of the pair of rolls.

7. Apparatus for removing rat excreta pellets and insect-damaged corn kernels from good whole corn kernels contaminated with the same and without damaging said good whole corn kernels which comprises an externally driven elongated impressionable first roll in pressure contact relationship with a yieldably mounted elongated impressionable second roll, both rolls being parallel to each other and in mutual frictional contact, means for applying a linearly distributed contact pressure to said rolls, means for rotating said rolls together in a contrarotational direction, means for feeding contaminated good whole corn kernels to said rolls, and an impact chamber adjacent said rolls having an internal ribbed deformable surface.

8. The apparatus of claim 7 wherein the surfaces of the impressionable rolls are provided with a plurality of corrugations.

9. The apparatus of claim 8 wherein the corrugations on one of the rolls are disposed at right angles to the corrugations on the other roll.

References Cited in the file of this patent

UNITED STATES PATENTS

| 2,649 | Flickenger et al. | May 28, 1842 |
|---|---|---|
| 872,927 | Gehr | Dec. 3, 1907 |
| 1,039,249 | Bloomfield | Sept. 24, 1912 |
| 1,118,078 | Train | Nov. 24, 1914 |
| 1,631,423 | Lucas | June 7, 1927 |
| 1,921,914 | Edman | Aug. 8, 1933 |
| 2,453,818 | Smith | Nov. 16, 1948 |
| 2,658,603 | Fernald | Nov. 10, 1953 |
| 2,879,007 | Persyn et al. | Mar. 24, 1959 |

FOREIGN PATENTS

| 2,531 | Great Britain | of 1915 |
|---|---|---|

OTHER REFERENCES

New Methods for Separating Rodent Pellets from Corn Kernels by Wohlrabe, Pfeifer and Dilley, from American Miller and Processor, April 1958, pages 23–27. (Photostat in 241-14.)